Patented Jan. 29, 1946

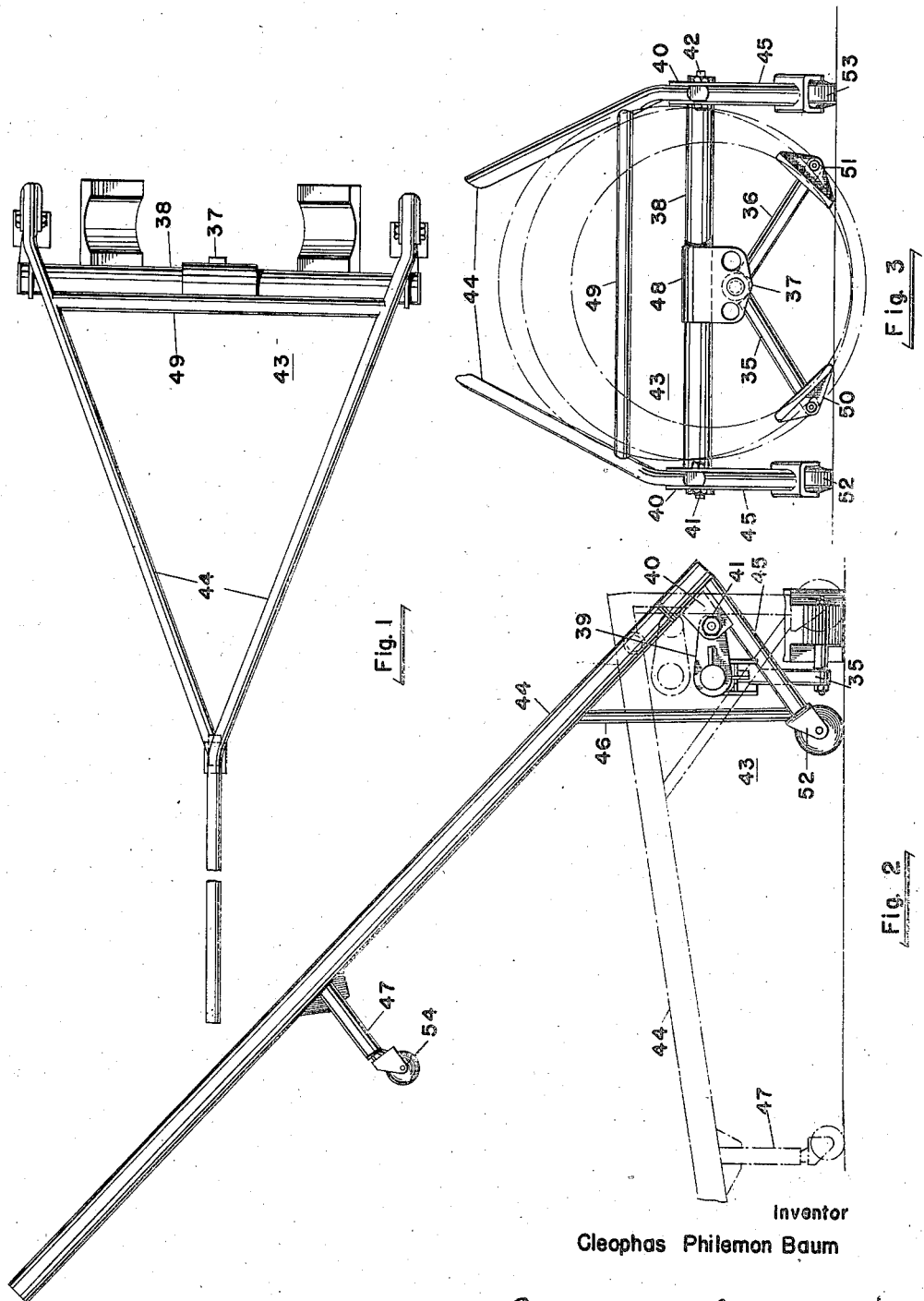

2,393,602

UNITED STATES PATENT OFFICE 2,393,602

AIRPLANE LIFT DOLLY

Cleophas Philemon Baum, Washington, D. C.

Original application June 1, 1943, Serial No. 489,267. Divided and this application July 29, 1944, Serial No. 547,240

2 Claims. (Cl. 280—46)

(Granted under the act of March 3, 1883, as amended April 30, 1928; 370 O. G. 757)

The subject of this invention is the construction of a suitable spotting dolly for use on aircraft carriers and in close quarters on landing fields and in hangars, for moving airplanes around, and into and out of compact parking arrangements. Some of the essential requirements of such dolly are that it may be operated by one man, that it will lift an airplane wheel substantially vertically without affecting the airplane otherwise, that it will be movable in any horizontal direction, and that it will be quickly releasable without causing lateral or longitudinal movement of the airplane.

The object of the subject device is to provide a dolly that will meet the above requirements and will be simple and compact in construction yet sufficiently rugged to withstand rough handling.

A further object is to construct a dolly which is adapted to embrace and quickly raise one wheel, but will engage only the tire and will not contact any other part of the airplane, such as the hub, axle, etc., and will not require any special fittings added to the airplane for lifting purposes.

A further object is to build a dolly so that it may be applied from the outboard side of either of the two conventional non-swivelling main wheels of an airplane without endangering the operator by a moving propeller or obliging him to crawl under the lower wing of a conventional biplane.

Further and more specific objects will become apparent as the description of the subject devices proceeds. Several illustrative forms of these devices are shown in the parent application of which this is a division, one of the forms being shown in the accompanying drawing in which, Fig. 1 is a plan view of one specific form of this device, Fig. 2 is an end view thereof, and Fig. 3 is an elevation of this form.

The same numerals are used to designate corresponding parts in the three views of the drawing.

The device herein disclosed is one specific form of the devices disclosed in the parent application Ser. No. 489,267 filed June 1, 1943, Patent No. 2,362,981, issued November 21, 1944, of which this is a division. It has means for applying a pair of shoes to the underside of a tire on an airplane, one shoe in front of the point of tire contact with the ground and the other in back of it, then lifting the tire off the ground by moving one or both shoes.

In this form of my device the shoes 50 and 51 are pivotally mounted on swingable arms 35 and 36 respectively, which are hung on a common pivot 37 mounted in a bracket 48 hung from a bar 38 which forms a C member with the arms 39. This C member is hinged at its ends to pivots 41 and 42 on bracket 40 on a lever arrangement 43. This lever arrangement consists of a long lever arm 44 extending from these pivots in a V shape to form a common handle. Upright portions 45 are joined to the hinge ends of this arm at right angles thereto and are braced by angular braces 46 to the sides of the V. At the lower ends of the upright portions 45 are mounted casters 52 and 53 swivelled to turn in any direction, similar to those used in the other forms of the device. Another upright member 47 somewhat shorter than the other two is mounted at right angles on this arm near the apex of the V and is also equipped with a swivelled caster 54 at its end. A brace 49 is provided near the open end of the V for greater strength. Thus in using this form of device it may be rolled into position with the shoes under the tire and the lever arm 44 lifted. Then by pulling the lever down the shoes will grip the tire and lift it until the arm reaches a horizontal position whereafter it will be slightly lowered until the caster on the short upright member 46 reaches the ground. The mechanism is stabilized in this position because the casters on the long upright members will have reached a position on the opposite side of the vertical plane passed through the pivots 41 and 42 thus providing a moment at these pivots about the lateral casters in the direction of the third caster due to the weight of the wheel etc. acting on the pivots.

In the construction of these devices the leverage system should be so designed that the maximum allowable effort applied at the end of the lever shall be not over 100 pounds.

It is obvious that various modifications in form, dimensions and arrangement may be made without departing from the scope of this invention as defined by the appended claims.

This invention may be used by or for the Government of the United States of America for governmental purposes without the payment of any royalties thereon or therefor.

What is claimed is:

1. A lever arm having a V-shaped end; the sides of the V being braced across near their extremities, said lever arm having portions at right angles to the plane of the V at its extremities braced for rigidity to the corresponding sides of the V and having swivelled casters at their ends, a prop parallel to said portions provided with a swivelled caster at its end and connected to the lever arm near the apex of the V, and a C formed cradle hinged at the said extremities and having a common pivot at the middle of the cradle for a pair of arms swingable at right angles to the plane of the C, a shoe being pivotally mounted at the end of each of these arms in hoe-like fashion and adapted to be moved under a wheel when the lever arm is raised, and then to lift said wheel when the lever arm is pulled down, said swingable arms being no longer than the radius of said wheel.

2. A dolly for lifting wheels comprising a lever split into two arms at one end to straddle a wheel, an upright portion rigidly connected to the end of each arm and having a swivelled caster at the bottom, a C member for straddling the wheel hinged at its ends to the ends of said arms, a pair of links having shoes hinged to their lower ends in hoe-like fashion to fit under the periphery of the wheel pivotally fastened to the middle portion of the C member to swing at right angles to the plane of the C.

CLEOPHAS PHILEMON BAUM.